US008942555B2

(12) United States Patent
Haramaty et al.

(10) Patent No.: US 8,942,555 B2
(45) Date of Patent: Jan. 27, 2015

(54) FIBER PROTECTION AND POWER SAVE WITH SECURITY

(71) Applicant: PMC-Sierra Israel Ltd., Herzliya Pituach (IL)

(72) Inventors: Zachi Haramaty, Hemed (IL); Elan Rohekar, Kfar Saba (IL); Barak Perlman, Rehovot (IL); Raziel Gabe, Ramat Gan (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 69 days.

(21) Appl. No.: 13/787,858

(22) Filed: Mar. 7, 2013

(65) Prior Publication Data

US 2013/0243418 A1    Sep. 19, 2013

Related U.S. Application Data

(60) Provisional application No. 61/607,019, filed on Mar. 6, 2012.

(51) Int. Cl.
*H04B 10/032* (2013.01)
*H04J 14/02* (2006.01)
*H04B 10/08* (2006.01)
*H04B 10/00* (2013.01)
*H04Q 11/00* (2006.01)
*H04J 3/14* (2006.01)

(52) U.S. Cl.
CPC ......... *H04B 10/032* (2013.01); *H04Q 11/0067* (2013.01); *H04J 3/14* (2013.01); *H04Q 2011/0079* (2013.01); *H04Q 2011/0081* (2013.01)

USPC ............ 398/5; 398/1; 398/2; 398/67; 398/25; 398/33

(58) Field of Classification Search
CPC H04J 14/0221; H04J 14/0227; H04J 14/0295
USPC ................................................. 398/5, 2, 1, 67
See application file for complete search history.

(56) References Cited

U.S. PATENT DOCUMENTS 6,501,574 B1 * 12/2002 Unno et al. .................... 398/106
8,000,602 B2 * 8/2011 Haran et al. ..................... 398/72
8,498,534 B2 * 7/2013 Hirth et al. ...................... 398/25

(Continued)

OTHER PUBLICATIONS

Trojer "Power Saving Modes for GPON and VDSL2" IEEE 802 LAN/MAN Standards Commitee.*

*Primary Examiner* — Oommen Jacob
(74) *Attorney, Agent, or Firm* — Mark M. Friedman (57) ABSTRACT

A system and method for Passive Optical Networks (PON) providing integration (cross-correlation) of powersave and fiber protection, optionally with encryption, facilitating the successful operation and/or benefits that can be gained when operating a PON system with these features. A major problem with power save is the detection, since both the OLT and the ONUs rely on a valid signal in order to detect fiber failure. However, the OLT may not detect this for sleeping ONUs, and an ONU in Tx/Rx sleep-mode, may not detect a fiber failure, and may not be aware of the OLTs switchover. In addition to solving the problem of combined fiber protection and power savings, a solution is also needed for providing security for this combination.

A current embodiment is a system and method for Passive Optical Networks (PON) providing integration (cross-correlation) of powersave and fiber protection, optionally with encryption.

14 Claims, 5 Drawing Sheets

(56) References Cited

U.S. PATENT DOCUMENTS

| | | |
|---|---|---|
| 8,774,621 B2 * | 7/2014 | Mukai .............................. 398/5 |
| 2006/0029389 A1 * | 2/2006 | Cleary et al. .................... 398/33 |
| 2010/0111523 A1 * | 5/2010 | Hirth et al. ...................... 398/25 |
| 2013/0243418 A1 * | 9/2013 | Haramaty et al. ................ 398/5 |
| 2013/0294775 A1 * | 11/2013 | Hirth et al. ...................... 398/67 |
| 2014/0193150 A1 * | 7/2014 | Mukai et al. .................... 398/67 |

* cited by examiner

FIGURE 1

TRUNK_1

PRIOR ART

FIGURE 2

TRUNK_2

PRIOR ART

FIBER PROTECTION AND POWER SAVE WITH SECURITY

CROSS-REFERENCE TO RELATED APPLICATIONS

This application claims the benefit of provisional patent application (PPA) Ser. No. 61/607,019 filed Mar. 6, 2012 by the present inventors, which is incorporated by reference.

FIELD OF THE INVENTION

The present invention generally relates to communications, and in particular, it concerns power saving and fiber protection of networks.

DEFINITIONS

The following terms are generally used in the industry, this document, and/or defined here for clarity. Further definition can be found in the below description and/or the applicable industry standard documents.

PON and EPON—a Passive Optical Network (PON) is a network in which user stations are connected to each other by means of a fiber-optical network that does not contain any active equipment. The different fiber segments, to which the stations are attached, are coupled together by one or more passive (not electrically powered) optical couplers or splitters. Optical couplers and splitters are devices that split optical power from one fiber into multiple fibers and vice versa. EPON (Ethernet passive optical network) is the IEEE Ethernet standard for PONs (IEEE 802.3ah-2004).

Figure 4:
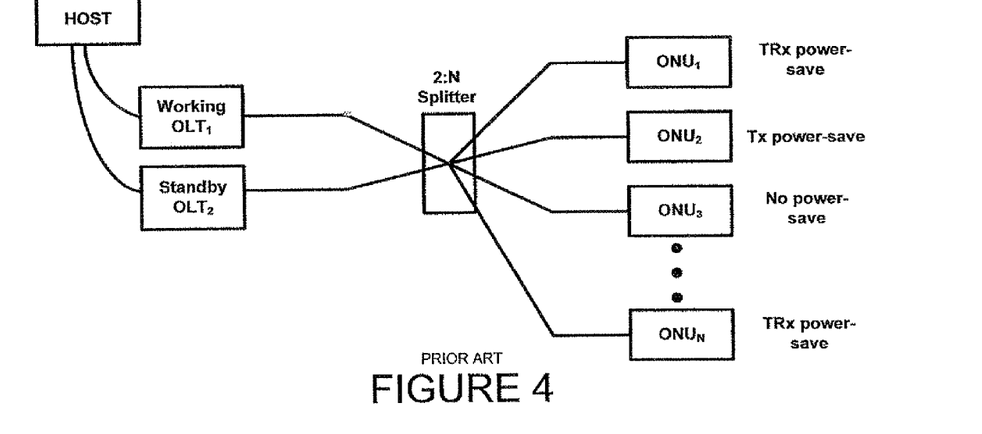
FIG. 4 is a diagram of a first example of a physical scheme for PON configuration.

Network configurations—FIG. 4 is a diagram of a first example of a physical scheme for PON configuration. In the current diagram an optical line terminal (OLT) OLT1 is the working OLT, OLT2 is the standby OLT. A HOST (generally a CPU management processor) connects to both OLT1 and OLT2, allowing information to pass through the HOST from the working OLT (in this case OLT1) or the standby OLT (in this case OLT2). Working OLT1 and standby OLT2 are connected via a SPLITTER to optical networking units (ONUs) ONU1, ONU2, ONU3, ..., ONUN. ONU1 and ONUN are in Tx/Rx sleep-mode (power-save). Note that in Tx/Rx sleep-mode, the ONU may be in sleep-cycle or in awake-cycle. ONU2 is in Tx sleep-mode (either in sleep-state or in awake-state). ONU3 is not in sleep-mode (power-save). Tx and Tx/Rx sleep-modes are described below.

Figure 5:
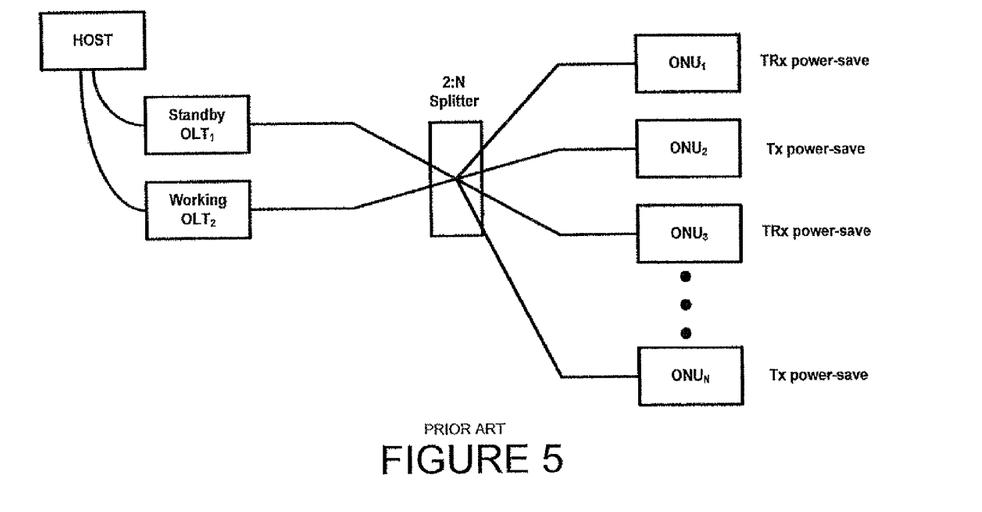
FIG. 5 is a diagram of a second example of a physical scheme for PON configuration.

FIG. 5 is a diagram of a second example of a physical scheme for PON configuration. The network configuration of FIG. 5 is the same as described in reference to FIG. 4. In the current diagram, all ONUs are in power-save either Tx or Tx/Rx. This is a special case of FIG. 4, where if all ONUs are in sleep-cycle then during this time the OLT may not get any indication of fiber failure.

PowerSave—PowerSave mode is when an ONU enters into a sleep-mode, for a certain amount of time, under certain conditions. Sleeping is usually done in cycles. The objectives of power savings modes in EPON are to reduce ecological impact, reduce operating cost, and extend battery backup time, while minimizing any degradation of network performance.

Figure 1:
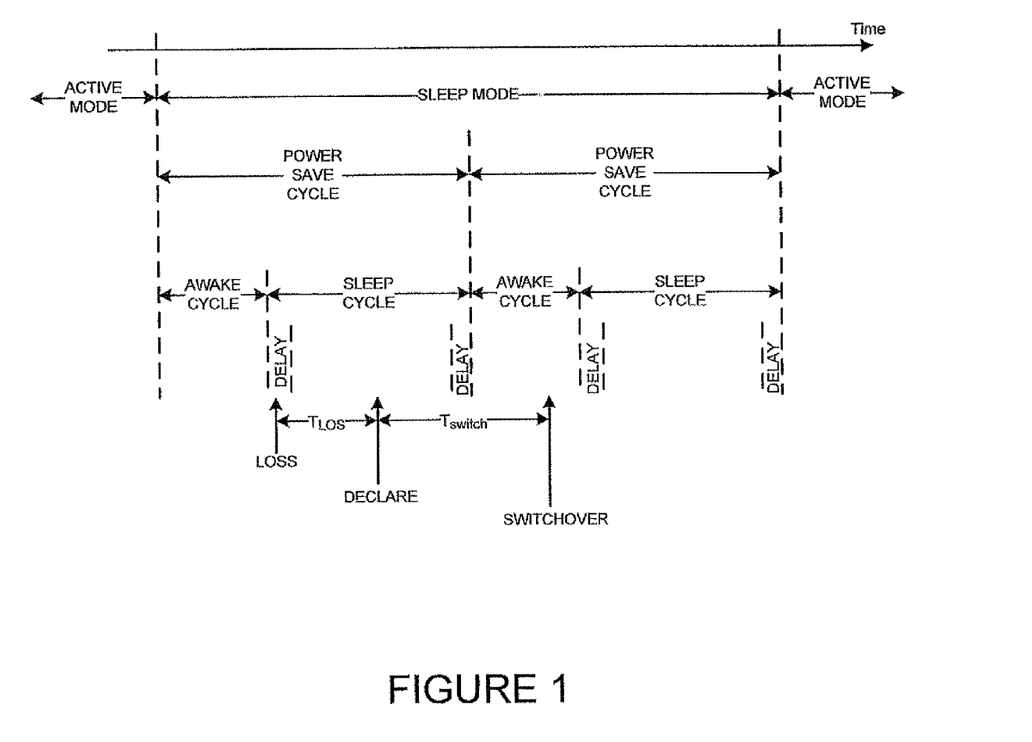
FIG. 1 is a diagram of sleep and awake-modes of an ONU in a PON.

As shown in FIG. 1, a diagram of sleep and awake-modes of an ONU in a PON, an ONU power save cycle includes sleep-cycle (with typical values of 30 ms to 1 s) and awake-cycle (typical values are ~5-10 ms).

An ONU in power-save (sleep-mode) may be either in Tx sleep-mode, where the ONU's receive path is functional all the time and the ONU's transmit path is functional only during awake-cycle, or in Tx/Rx sleep-mode where the ONU's receive path and the ONU's transmit path are functional only during the awake-cycle.

Redundancy—is the duplication of critical components or functions of a system with the intention of increasing reliability of the system, usually in the case of a backup or fail-safe.

Fiber Protection—(also referred to in the context of this document as simply "protection") to improve network reliability and survivability, fiber protection switching mechanism can be used in EPON system (includes different redundancy mechanisms). Fiber protection switching can be performed by the following two modes:

a) Automatic switching protection: Triggered by PON system failure—discovery mechanisms, such as signal loss and signal degradation, etc.

b) Planned switching: Triggered by management unit upon management/planned events.

Referring to FIG. 1, the relationship between the following modes and cycles can be seen. Note that the loss of signal and switchover timing in the current diagram are for a case of automatic switchover.

Awake-mode: an operating mode of an ONU, in which all of the ONU's subsystems in the transmit and receive paths are powered up and fully functional.

Sleep-mode: An operating mode of an ONU, in which some of the ONU's subsystems in the transmit (Tx sleep-mode) and transmit and receive (Tx/Rx sleep-mode) path are powered down to save energy. An ONU can be in any combination of the modes. An ONU may also not have a sleep-mode, hence effectively does not have, or go into, a power saving cycle. Includes one or more power-save cycles.

Tx sleep-mode: ONU mode in which only components of the transmit path power down (sleep), while the receive path remains fully powered on and synchronized to downstream data.

Tx/Rx sleep-mode: ONU mode in which components of both the transmit and receive paths power down (sleep).

Power-save cycle: a period of time including sleep-cycles and awake-cycles.

Sleep-cycle: a period of time in power save cycle during sleep-mode in which some of each ONU's subsystems are in sleep-mode. The duration of the sleep-cycle is represented as the length of awake-cycle in FIG. 1.

Awake-cycle: a period of time between two consecutive sleep-cycles in which an ONU is in awake-mode.

length of sleep-cycle: an amount of time for which an ONU is requested to enter a sleep-state (sleep-cycle).

length of awake cycle: an amount of time for which an ONU is requested to enter an awake-state (awake-cycle) and/or the length of time an ONU is awake.

LOSS: Used in the context of this description for convenience to refer to a time at which signal is lost (for example, via fiber cut, OLT power-off, ONU power-off, etc.)

DECLARE: Used in the context of this description for convenience to refer to a time at which loss of signal is declared and the OLT/ONU transitions to a switchover state. $T_{LoS}$=DECLARE—LOSS.

SWITCHOVER: Used in the context of the figures for convenience to refer to a time at which switchover from a working OLT to a standby OLT is initiated. $T_{switch}$=SWITCHOVER—DECLARE. In this context, upon planned switchover, DECLARE can be the time that the HOST asked for switchover from the OLT, and not due to LOSS indication)

DEREGISTERED state: if the timestamp drift error is detected independently in OLT side or in ONU side, the ONU transitions to the DEREGISTERED state. The ONU needs to complete the registration process from discovery gate until completion per IEEE 802.3 standards.

DS: Downstream.

HOLDOVER state: EPON devices which support link protection will be in the HOLDOVER state during the switching time between the working OLT and the stand-by OLT.

LLID: Logical link identifier.

maximum sleep time of all registered LLIDs: maximum length of sleep-cycle of all registered ONUs and/or all registered LLIDs.

PCC (PON Cycle Counter): 32 LSB (least significant bits) of the PON counter, sent as a timestamp from an OLT to ONUs.

PON clock: One of EPON's fundamental parameters is the PON clock. The PON clock toggles ("clocks") every 16 nsec (nanoseconds) as per IEEE 802.3ah. The OLT and the ONU each have 64-bit counters, known as a "PON counter", or in the context of this document simply a "counter", which counts the number of PON clock cycles. An OLT transmits a timestamp (also known as an MPCP timestamp, a 32 bit value of the OLT's PON counter) in every MPCPDU ((Multi Point Control Protocol Data Unit management frame) that the OLT sends towards the ONUs. The 32 LSBs of the PON counter are known as PCC (PON Cycle Counter). The 32 MSBs of the PON counter are known as RCC (round cycle counter). In normal operation, the PON counter of the ONU should match the (master) EON counter of the OLT.

Previous working OLT: OLT in fiber protection, operations of which have been taken over by a standby OLT. The previous working OLT is not handling communication over the network, and the former standby OLT is the new working OLT.

Power-up: In the context of this document, an alternative reference to an ONU in an awake-mode.

RCC (Round Cycle Counter): 32 MSB (most significant bits) of the PON counter.

REGISTERED state: an ONU will be in the REGISTERED state while the ONU is registered to an OLT. The ONU will be in the REGISTERED state if the discovery process between the OLT and the ONU been completed successfully and registration is acknowledged (defined in IEEE 802.3, 64 for 1 G-EPON, and 77 for 10 G-EPON).

RTT—round trip time.

Scheme: In the context of this document, generally refers to a method of PON operation.

SCI: Secure Channel Identifier.

SCI.SA: Source address (MAC address) field of an SCI.

SecTag: Security tag.

Standby OLT: OLT in fiber protection that is not handling communication over the network and is maintained in the same configuration as the working OLT.

timestamp: 32 LSB (least significant bits) of the PON counter (PCC), sent as a timestamp from an OLT to ONUs.

$T_{LoS}$: Loss of signal time. Indicates a period of time that has to elapse from a loss of signal before an OLT/ONU transitions to a switchover state (if the system supports switchover, else the system is broken and there is no connection between the OLT and ONU until the problem is fixed), if no REPORT/GATE MPCP has been received.

$T_{switch}$: Switching time or switchover time. Indicates a period of time that has to elapse after loss of signal (after $T_{LoS}$ has elapsed, when an OLT is in a switchover state), before initiating switchover from a working OLT to a standby OLT.

US: Upstream.

Working OLT: OLT in fiber protection that is handling communication over the network.

Figure 2:
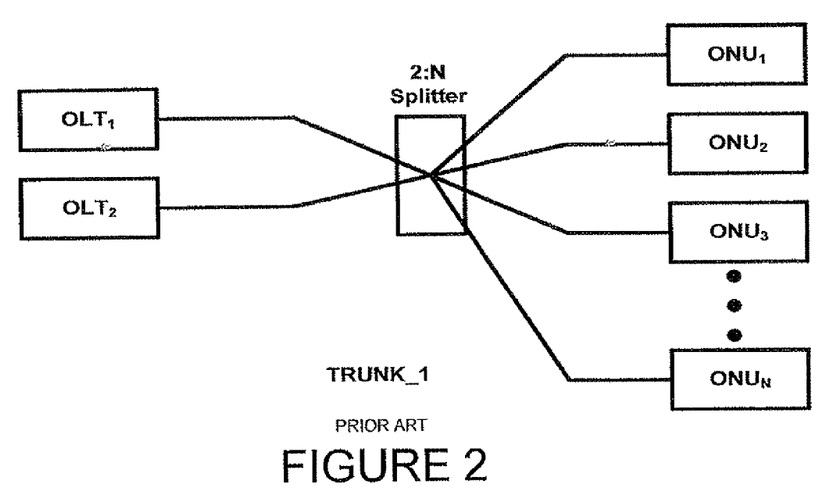
FIG. 2, a diagram of trunk_1 fiber protection.
Figure 3:
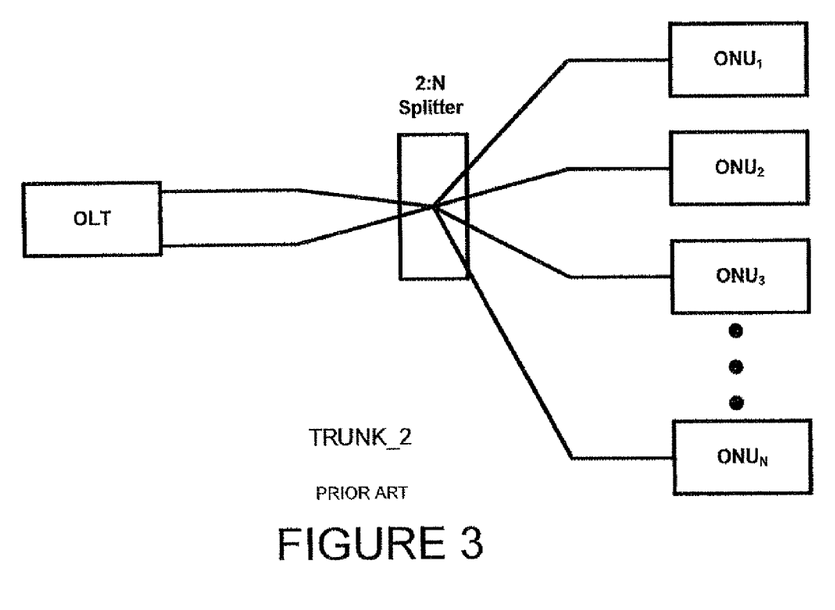
FIG. 3, a diagram of trunk_2 fiber protection.

Referring to FIG. 2, a diagram of trunk_1 fiber protection, and FIG. 3, a diagram of trunk_2 fiber protection, there are two general architectures (schemes) for trunk fiber protection. In FIG. 2, exemplary trunk_1 network configuration includes OLT1 and OLT2 connected in parallel to a SPLITTER, and via the SPLITTER to ONU1, ONU2, ONU3, ..., ONUN. In FIG. 3, exemplary trunk_2 network configuration is similar to trunk_1, but includes a single OLT having two parallel connections to a SPLITTER, and via the SPLITTER to ONU1, ONU2, ONU3, ..., ONUN. In trunk_1 the OLTs are also protected from failure by using at least two OLTs—a working OLT and one or more (typically one) standby OLT.

Fiber failure—Fiber failure refers to the status of the PON when a fiber needs to be replaced, either in routine maintenance or because a fiber failed, and includes three different cases:

1. Manually invoked: if the OLT switchover or fiber repair is manually invoked, then the working OLT must disable the power save to all ONUs and then the fiber protection can start when power save is off. After switchover the power save can get back. Therefore this case is easy to handle. Referring again to FIG. 4, in a typical case of manually invoked OLT switchover, a HOST notifies all OLTs (in this example OLT1 and OLT2) that a switchover is desired. The working OLT (OLT1) notifies all ONUs to (transition to and) stay in awake-mode, that is, not to enter sleep-mode. The working OLT waits a sufficient time for any ONUs that are in sleep-cycle to transition to awake-cycle, receive notification, and transition to awake-mode. Hence all ONUs are in awake-mode when the switchover occurs.

2. Automatically invoked (e.g. by an accidental fiber cut). This is the case dealt with in this document. There are two sub cases:

Tx sleep-mode: the ONU has receive path working while in sleep-cycle.

Tx/Rx sleep-mode: the ONU may have the receive path off while in sleep-cycle.

3. Fiber disconnect: after an ONU tries and fails to reconnect from an "Automatically invoked" fiber protection the ONU understands that the ONU or the trunk has a fiber cut.

BACKGROUND OF THE INVENTION

Work is currently underway in the area of service interoperability for Ethernet passive optical networks (EPON). This work is likely to result in new standards. Work is being done and definitions being formed in the area of Optical Link Protection, know as fiber protection or redundancy, and in the area of power save.

A major problem with power save is the detection of fiber failure during power save, since both the OLT and the ONUs rely on a valid signal in order to detect fiber failure. However, the OLT may not detect a valid signal for sleeping ONUs (ONUs in sleep-mode). Correspondingly, an ONU in Tx/Rx sleep-mode may not detect a fiber failure and may not be aware of the OLTs switchover. In addition to solving the problem of combined fiber protection and power savings, a solution is also needed for providing this combination when security is enabled.

There is therefore a need to define an integration (cross correlation) of fiber protection, power save, and encryption.

SUMMARY

According to the teachings of the present embodiment there is provided a method for operating a PON (passive optical network) including at least one ONU (optical networking unit) and an OLT (optical line terminal), wherein at least one of the at least one ONU is operating in Tx or Tx/Rx power saving sleep-mode; including the steps of: setting length of awake-cycle of each ONU to be greater than TLoS (loss of signal time); transitioning said each ONU, upon detecting a fiber failure, switchover notification, or switchover occurrence: from sleep-mode to awake-mode; and REGISTERED to HOLDOVER state, and setting Tswitch (switchover time) of the OLT to be at least as long as maximum sleep time of all registered LLIDs.

In an optional embodiment, the method further includes the step of: transmitting, by each ONU, two REPORT packets at each awake-cycle. In another optional embodiment, at least one of the at least one ONU corresponds to a first portion of ONUs corresponding to a first pivot list of ONUs, further including the step of: configuring, by the OLT, the first portion of ONUs to be in a mode other than Tx/Rx sleep-mode. In another optional embodiment, the PON includes at least two ONUs and a second portion corresponding to a second pivot list of ONUs includes at least one of the at least two ONUs other than in the first portion, and the first portion of ONUS is changed to include at least the second portion of ONUs. In another optional embodiment, the first pivot list of ONUs is static and transmitted from the OLT to a standby OLT.

In another optional embodiment, the PON includes at least two ONUs, further including the step of: checking, by the OLT, for fiber failure based on a portion of the at least two ONUs. In another optional embodiment, the method further includes the step of transmitting repeatedly until maximum sleep time of all registered LLIDs has passed, by the OLT, SYNC_GATES at a time delta which is less than the ONUs' length of awake-cycle. In another optional embodiment, the method further includes the step of: transmitting repeatedly until maximum sleep time of all registered LLIDs has passed, by the OLT, a wakeup command at a time delta which is less than length of awake-cycle.

In another optional embodiment, the OLT includes an OLT RCC (round cycle counter) and each ONU includes an ONU RCC, the method further including the steps of: continuing, at each ONU, normal operation of each of the ONU RCC at HOLDOVER state; resetting, at the OLT, OLT RCC upon switchover if the PON is configured as a trunk_1 architecture; and resetting RCC at each ONU if: each ONU is in HOLDOVER state; switchover has occurred within a designated period; and each ONU is unable receive packets due to decrypter error.

In another optional embodiment, the method further includes the step of: continuing, at the ONUs, to use a previous encryption key for encrypting upstream data, while in HOLDOVER state. In another optional embodiment, the method further includes the steps after a switchover of: setting, at the OLT and the ONUs, a value of nextPN to be a pre-determined value less than 0xfff_fff based on a given time; and changing in less than the given time, by the OLT, to use new encryption keys.

In another optional embodiment, the pre-determined value is selected from the group consisting of: a. 0xfc0_fff; and a value based on at least the minimum time required for changing encryption keys.

In another optional embodiment, the method further includes the steps of: reserving values of nextPN above a pre-determined value, the reserved values to be used during switchover; and setting nextPN, after a switchover, to one of the reserved values.

In another optional embodiment, the EPON is selected from the group consisting of: a 1 G EPON; and a 10 G EPON.

According to the teachings of the present embodiment there is provided an ONU (optical networking unit) operating in Tx or Tx/Rx power saving sleep-mode, the ONU configured: setting an length of awake-cycle greater than TLoS (loss of signal time); and transitioning the ONU, upon detecting a fiber failure, switchover notification, or switchover occurrence: from sleep-mode to awake-mode; and from REGISTERED to HOLDOVER state.

In an optional embodiment, the ONU is further configured based on a configuration selected from the group consisting of: transmitting, by each ONU, two REPORT packets at each awake-cycle; continue to use a previous encryption key for encrypting upstream data, while in HOLDOVER state; and reserve values of nextPN above a pre-determined value, the reserved values to be used during switchover; and setting nextPN, after a switchover, to one of the reserved values.

According to the teachings of the present embodiment there is provided a system including: an OLT (optical line terminal) operated based on a configuration selected from the group consisting of: setting Tswitch (switchover time) of the OLT to be at least as long as maximum sleep time of all registered LLIDs; configuring a first portion of one or more ONUs (optical networking units) to be in a mode other than Tx/Rx sleep-mode; checking for fiber failure based on a portion of at least two ONUs, the at least two ONUs operationally connected to the OLT; transmitting, repeatedly until maximum sleep time of all registered LLIDs has passed, SYNC_GATEs at a time delta which is less than length of awake-cycle; transmitting, repeatedly until maximum sleep time of all registered LLIDs has passed, a wakeup command at a time delta which is less than length of awake-cycle; and reserve values of nextPN above a pre-determined value, the reserved values to be used during switchover; and setting nextPN, after a switchover, to one of the reserved values.

According to the teachings of the present embodiment there is provided a PON (passive optical network) system including: at least one ONU (optical networking unit), each ONU configured: setting length of awake-cycle to be greater than TLoS (loss of signal time); transitioning upon detecting a fiber failure, switchover notification, or switchover occurrence: from sleep-mode to awake-mode; and from REGISTERED to HOLDOVER state; and an OLT (optical line terminal) configured: setting Tswitch (switchover time) of the OLT to be at least as long as maximum sleep time of all registered LLIDs.

In an optional embodiment, the ONU is further configured based on a configuration selected from the group consisting of: transmitting, by each ONU, two REPORT packets at each awake-cycle; continue to use a previous encryption key for encrypting upstream data, while in HOLDOVER state; and reserve values of nextPN above a pre-determined value, the reserved values to be used during switchover; and setting nextPN, after a switchover, to one of the reserved values, and the OLT (optical line terminal) is operated based on a configuration selected from the group consisting of: setting Tswitch (switchover time) of the OLT to be at least as long as maximum sleep time of all registered LLIDs; configuring a first portion of one or more ONUs (optical networking units) to be in a mode other than Tx/Rx sleep-mode; checking for fiber failure based on a portion of at least two ONUs, the at least two ONUs operationally connected to the OLT; transmitting, repeatedly until maximum sleep time of all registered LLIDs has passed, SYNC_GATES at a time delta which is less than length of awake-cycle; transmitting, repeatedly until maximum sleep time of all registered LLIDs has passed, a wakeup command at a time delta which is less than length of awake-cycle; and reserve values of nextPN above a pre-determined value, the reserved values to be used during switchover; and setting nextPN, after a switchover, to one of the reserved values.

BRIEF DESCRIPTION OF FIGURES

The embodiment is herein described, by way of example only, with reference to the accompanying drawings, wherein.

DETAILED DESCRIPTION

As a guide to the reader, an outline of the below description is provided: Initially, eight problems with implementing powersave and fiber protection are identified. Then an implementation of a first solution is described, followed by a description of how this first solution is applied to the eight problems. Then an implementation of a second solution is described, followed by a description of how this second solution applies to the eight problems. Following the descriptions of the first and second solutions, the issue of encryption is addressed, presenting several problems and then solutions for encryption with powersave and fiber protection.

In recent years, Standards bodies (such as IEEE—The Institute for Electrical and Electronic Engineers), have made progress in the area of service interoperability for EPON. The results of the work of these Standards bodies will provide combined definitions for features of EPON technology, that is, EPON powersave, fiber protection, and redundancy. By using the resulting work, service providers will have solutions for providing beneficial features in EPON systems. While each of these features (powersave, fiber protection, and encryption) provides benefits, the integration (cross-correlation) of powersave and fiber protection, optionally with encryption, has not been defined, thus limiting the successful operation and/or benefits that can be gained when operating an EPON system with these features.

A current embodiment is a system and method for Passive Optical Networks (PON) providing integration (cross-correlation) of powersave and fiber protection, optionally with encryption.

4.1 Problem #1—OLT detection: The OLT detects fiber cut by checking the Rx path. The OLT does this checking for $T_{LoS}$ duration, to determine if the fiber is non-functional. This is done, for example, by checking if no REPORT MPCP has been received from any ONU. If this has happened, then a fiber failure is declared and switchover state must be invoked.

However, if some ONUs are now in power-save sleep-cycle then the OLT may get this indication from a portion of ONUs (that are not in sleep-cycle) but the OLT cannot immediately get this indication from all ONUs.

Tx/Rx sleeping ONUs will not detect and will not respond, Tx sleeping ONUs will detect but will not respond.

4.2 Problem #2—Tx ONU switchover while in sleep-cycle: If the PON operating scheme allows an OLT switchover while some ONUs are in power-save sleep-cycle, then an ONU which is right now at Tx sleep-cycle may encounter a new working OLT when the ONU returns to an awake-cycle. However, due to the lack of synchronization of the previous working OLT and the new working OLT, the new working OLT may not know when the ONU sleep-cycle ends and the OLT may not be able to communicate with the ONU after the ONU transitions to awake-cycle. Further, if information passing through the host is slow, or an OLT failure has occurred such as a power failure, then the new working OLT may not know which ONUs are now in power-save cycle and which ONUs are not in power-save cycle (that is, in awake-mode).

4.3 Problem #3—Tx/Rx ONU switchover while in sleep-cycle: If the PON operation (scheme) allows an OLT switchover while some ONUs are in power-save sleep-cycle then an ONU which is right now at Tx/Rx sleep-cycle (power save mode) may not at all be aware of a switchover. The ONU at Tx/Rx sleep-cycle may wake up for the next awake-cycle to a network where a new working OLT is a handling communication over the network, having correspondingly new timestamp and a new OLT MAC address, which should be a reason for an immediate deregistration of the ONU according to the protocol. Even more, due to the lack of synchronization of the previous working OLT and the new working OLT, the new working OLT may not know when the ONU sleep-cycle ends and the OLT may not be able to contact the ONU when the ONU transitions to awake-cycle. Even more, if information passing through the host is slow, or an OLT failure has occurred such as a power failure, then the new working OLT may not know which ONUs are now in power-save cycle and which ONUs are not in power save cycle.

4.4 Problem #4—New working OLT transmits a one-time SYNC GATE: In a case where the new working OLT transmits a one-time SYNC_GATE, an OLT switchover can occur while some ONUs are in power-save sleep-cycle. In this case, an ONU which is at Tx/Rx sleep-mode when a switchover happens may miss the SYNC_GATE. The ONU will not be aware of the new timestamp and the ONU will probably get deregistered when getting a new timestamp from the new working OLT.

4.5 Problem #5—New working OLT may not know the wake-up time of sleeping ONUs: A problem can arise if a new working OLT does not know the wake-up time of sleeping ONUs. If the former working OLT and former standby OLT were aligned in time, or in case of trunk_2 (FIG. 3), this problem does not arise with these two OLTs. However, if the two OLTs were not aligned in time (each of the two OLTs having a different timestamp) then the information passing between the OLTs through the host cannot include the actual time for each sleeping ONU of when each of the sleeping ONUs will be in awake-cycle. Thus, the new working OLT will not know when to contact the sleeping ONUs.

4.6 Problem #6—ONU time for fiber failure detection: A Tx/Rx sleeping ONU may have to detect fiber failure during an awake-cycle. The problem is that the period of the awake-cycle can be short (typically net 1 ms (millisecond) of receive time) while the $T_{LoS}$ duration may be relatively long (typically 5 ms). So the amount of time the ONU is in the awake-cycle may be insufficient to detect fiber failure.

4.7 Problem #7—OLT False fiber failure detection: In order to have a stable detection of fiber failure the OLT has to check for a $T_{LoS}$ duration, the time of which is not long compared to the wake-cycle (with typical values of 5 ms) allowing a loss of some REPORTs where any one received REPORT will cause a no fiber failure detection. However, in awake-cycle each ONU transmits only one REPORT so the probability of false detection grows (probability of detecting a fiber failure where there is no actual fiber failure).

An extreme case of false detection would be with two ONUs, one awake which has stopped transmitting and one in power-save where a BER of $10^{-12}$ means a frame error of $=1-(1-10^{-12})^{(64*8)}=5*10^{-10}$, so a false detection may happen at a probability of $5*10^{-10}$ per power-save cycle.

Assuming an awake-cycle every 100 ms then the chance of false detection become $1-(1-5*10^{-10})^{(10*60*60*24)}=0.04\%$ for a false fiber failure detection per one day for one system. This means and a chance of 14% of for a false fiber failure detection per one year for one system.

4.8 Problem #8—Calculation of RTT for all ONUs: There are 4 cases for calculating an RTT (round trip time) for all ONUs:

1. Both working and standby OLTs have the same RTT. This case presents no problems for fiber protection with power save.
2. Standby OLT has knowledge of the Standby OLT's RTT (for example, from a trial before the switchover). This case presents no problems for fiber protection with powersave.
3. Standby OLT knows the RTT of the working OLT for all ONUs. This presents a problem, since the new working OLT has to know which ONU is now in awake-mode in order to check the ONU's RTT.
4. Standby OLT does not know the RTT of the working OLT for all ONUs. This presents a problem, since the new working OLT has to know which ONUs are now in awake-mode in order to check the ONU's RTT.

As described above, there are two general architectures (schemes) for trunk fiber protection—trunk_1 (FIG. 2) and trunk_2 (FIG. 3). From implementation point of view, trunk_1 is more complicated to implement, whereas the solutions for trunk_1 include the solutions for trunk_2. Therefore for simplicity and clarity of explanation this document will focus on trunk_1. Based on this description, one skilled in the art will be able to implement the current invention for trunk_1 and trunk_2.

Figure 6:
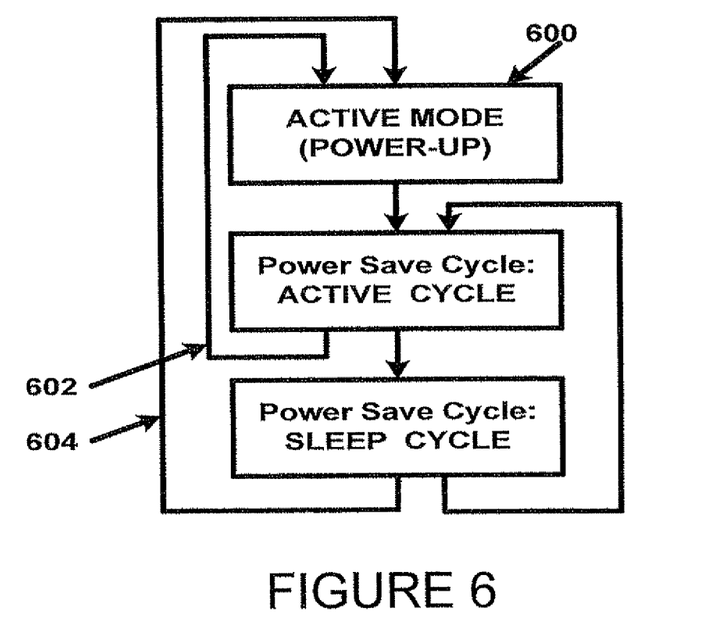
FIG. 6 is an ONU operational state diagram.
Figure 7:
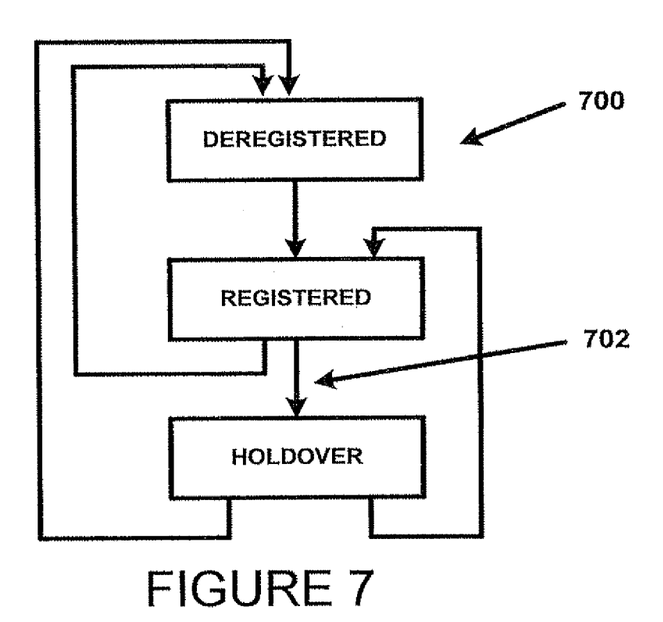
FIG. 7 is an ONU switchover state diagram.

First Embodiment—FIGS. 6-7

6.1 A first embodiment, also known in this document as "solution set #1" is a case where switchover is done when all ONUs are in awake-mode (power-up). When all ONUs are in sleep-cycle then in order to detect fiber failure the OLT must wait until at least some or all of the ONUs are in awake-mode. When all ONUs are in sleep-cycle, and synchronized mode is used, such that all ONUs wake up at the same time, then fiber failure can only be detected when all ONUs are power-up. Thus the switchover time ($T_{switch}$) is extended by (set to a value) up to the maximum sleep time of all registered LLIDs.

When an unplanned switchover occurs, there are two cases:

1. ONU will stay awake after sleep-cycle (waiting to receive an OLT frame, after which the ONU will enter again into sleep-cycle). In this case, a solution is for the ONU to wait.
2. ONU will go back to sleep after the awake-cycle. The new OLT needs to synchronize the sleep cycles. A solution is described in the paragraph applying solution set #1 to problem #3 (below).

Even if some ONUs are non-sleeping, the user may decide to do switchover "on the safe side" by waiting for a response from all ONUs (by REPORT frame) before allowing the OLT to invoke a switchover.

Solution set #1 facilitates improvements over conventional (existing) power save techniques, including:

In a case where all ONUs are in Tx/Rx sleep-mode and wakeup is synchronized, then this solution set #1 is preferred. In other cases, this solution provides robustness since failure detection is based on all ONUs, and since the switchover is done while all ONUs are in awake-mode (at power-up).

In general, this scheme of solution set #1:

1. extends switchover (increases switchover time $T_{switch}$) of the OLT,
2. extends length of awake-cycle of the ONU (less power saving), and
3. changes the power save state transitions to include transitioning from awake-cycle to awake-mode when detecting fiber failure.

Note that extending length of awake-cycle may apply to solution set #1 for both problems #6 and #7, while extending length of awake-cycle may apply to solution set #2 for only problem #7.

The following description examines solution set #1 in the context of the above-described problems #1-6, 8.

6.1.1 Applying solution set #1 to problem #1 (OLT detection), if a non synchronized scheme is used then the OLT has to wait for each ONU to wake up and transmit a REPORT packet. The amount of time required for waiting for each ONU to wake up is the maximum sleep time of all registered LLIDs. Both working OLT and standby OLT should know the value of maximum sleep time of all registered LLIDs. In the current case, the OLT may have to wait the maximum sleep time of all registered LLIDs, for all ONUs to wake up and transmit a REPORT packet. If a REPORT was received from any of the ONUs, then a fiber failure is not declared. Eventually, an ONU which will not transmit a REPORT for up to MPCP timeout will become deregistered by the OLT.

In a non-limiting example, in FIG. 1, LOSS (fiber is cut or other issue) happens are the beginning of a sleep-cycle. The OLT waits $T_{LoS}$ and then at time DECLARE, declares loss of signal and prepares for switchover from working to standby OLT. After waiting $T_{switch}$ operation of the network switches from the working OLT to the standby OLT. If Tswitch is less than maximum sleep time of all registered LLIDs, one or more of the ONUs may still be in sleep-cycle when the switchover occurs. When the previously sleeping ONU(s) transition to awake-cycle or awake-mode, these ONUs that were sleeping during switchover are now in the undesirable scenario of having to deal with a new working OLT. By increasing the switchover time $T_{switch}$, all ONUs will at least be in awake-cycle and can transition to awake-mode (leaving sleep-mode) as needed.

If a synchronized sleep scheme is used then the OLT has to wait to the next common awake-cycle. This may take up to maximum sleep time of all registered LLIDs. Only at the awake-cycle can the OLT check for fiber failure.

Note that this scheme requires an increase of the total time of fiber protection switchover. The increase is by up to maximum sleep time of all registered LLIDs. If the switching time between working OLT and stand-by OLT is less than or equal to $T_{switch}$ (with typical values such as 50 ms and 150 ms), then $T_{switch}$ will be increased by maximum sleep time of all registered LLIDs (with typical values of 30 ms-1 Sec).

This solution features a change in the regular method of fiber protection by increasing the switchover time ($T_{switch}$) up to maximum sleep time of all registered LLIDs in order to handle power saving ONUs. This is non-obvious because normally one would not want to increase the switchover time in order to avoid affecting the quality-of-service. Longer times between OLTs switchover cause more packets loss. Hence the accepted practice in the industry is to try to reduce the switchover time, in contrast to the current embodiment that increases switchover time.

6.1.2 Applying solution set #1 to problem #2 (Tx ONU switchover while in sleep-cycle), Tx-sleeping ONUs can detect fiber failure at any time since these ONUs receive downstream packets. Once an ONU has detected fiber failure, the ONU will transition from power-save awake-cycle (awake-state) or from power-save sleep-cycle (sleep state) to awake-mode, and from REGISTERED to HOLDOVER state. These transitions are shown respectively in FIG. 6, an ONU operational state diagram 600, and FIG. 7, an ONU switchover state diagram 700. Arrows 602 and 604 show operational state transition from respectively awake-cycle and sleep-cycle to awake-mode. Arrow 702 shows switchover state transition from REGISTERED to HOLDOVER. Since the working OLT waits an extended period before declaring fiber failure and initiating a holdover then the OLTs switchover is done while all ONUs are in power-up, so the switchover becomes a regular switchover scheme.

FIG. 6 shows ONU operational states and transitions 600. An ONU in awake-mode (power-up) can transition to power save cycle and be in an awake-cycle. Conventional transition from the awake-cycle is to a sleep-cycle of the power save cycle. As described above, in the current embodiment the ONU can also transition to awake-mode. From sleep-cycle the ONU can transition either to awake-mode or start another power save cycle and transition to awake-cycle.

FIG. 7 shows ONU switchover state diagram and transitions 700. An ONU in a DEREGISTERED state can transition to a REGISTERED state. From the REGISTERED state the ONU can transition either to the DEREGISTERED state or a HOLDOVER state. From the HOLDOVER state the ONU can transition either to the DEREGISTERED state or the REGISTERED state. A transition from REGISTERED to HOLDOVER will be establish upon fiber cut or when the host management implements a planned holdover for maintenance or other purposes.

This solution features a change in the regular method of fiber protection since now ONUs in Tx sleep-mode must exit this state due to fiber failure. This is not obvious since, as this solution is not currently being discussed in the field as a possible option and is not discussed as part of the power save protocols.

6.1.3 Applying solution set #1 to problem #3 (Tx/Rx ONU switchover while in sleep-cycle), Tx/Rx-sleeping ONUs can detect fiber failure only when the Tx/Rx-sleeping ONU is in an awake-cycle. Since the working OLT waits an extended period of time ($T_{switch}$) before declaring fiber failure and initiating a holdover, each of the ONUs has a chance to transition to awake-cycle (as a normal function of the power save cycle) and detect fiber failure. Once an ONU has detected fiber failure, the ONU will transition from power-save awake-cycle to awake-mode in the power save states as shown in FIG. 6 and from REGISTERED to HOLDOVER state in the switchover states as shown in FIG. 7 above. When the ONU transitions to HOLDOVER state, the ONU can check timestamp and/or OLT MAC address. If the timestamp and/or MAC address needs to be updated, the timestamp and/or MAC address on the ONU is updated which indicates that a switchover has occurred, referred to in the context of this document as a switchover occurrence.

Using this method of ONU operation, the OLTs switchover is done while all ONUs are in awake-mode, so the switchover becomes a regular switchover scheme. In other words, as the switchover is done when all ONUs are awake, no change is needed to the operation of ONUs, only a change is needed at the OLT to wait an extended period of time before declaring fiber failure. As shown by arrow 700, the ONU will also transition from REGISTERED to HOLDOVER state at Tx sleep and Tx/Tx/Rx awake, if detected.

6.1.4 Applying solution set #1 to problem #4 (new working OLT transmits a one-time SYNC_GATE), since all ONUs are in awake-mode after the OLTs switchover, this solution solves the problem with the one-time SYNC_GATE.

6.1.5 Applying solution set #1 to problem #5 (new working OLT may not know the wake-up time of sleeping ONUs), Since all ONUs are in awake-mode after the OLTs switchover, this solution solves the problem of a new working OLT not knowing the wake-up time of ONUs in sleep-cycle (sleeping ONUs).

6.1.6 Applying solution set #1 to problem #6 (ONU time for fiber failure detection), A Tx/Rx sleeping ONU may have to detect fiber failure during an awake-cycle. The problem is that the period of the awake-cycle (length of awake-cycle) is short (typically net 1 ms of receive time) while the $T_{LoS}$ duration may be relatively long (typically 5 ms).

Two solutions include extending the length of awake-cycle and decreasing the $T_{LoS}$ duration. Decreasing the $T_{LoS}$ may be problematic since this increases the probability of false fiber failure detection by the ONU. On the other hand, increasing the length of awake-cycle to be greater than $T_{LoS}$ will result in more power consumption. Given the cost/benefit of these two solutions, a preferred implementation is to only set (increase) the length of awake-cycle to be greater than $T_{LoS}$.

This solution features a change in the regular method of power save since this solution increases the length of awake-cycle. This solution is not obvious since one would not want to increase the length of awake-cycle since this causes a somewhat lowering of the overall power saving, 6.1.7 Applying solution set #1 to problem #8 (Calculation of RTT for all ONUs), since all ONUs are in awake-mode, this case is handled in the same manner as for regular fiber protection using solution #1.

6.1.9 In summary, solution set #1 features changes to the conventional (existing standard) power-save scheme including:

1. ONU at Tx sleep-mode: when detecting a fiber failure transitions to awake-mode (power-up/exits power save cycle). In other words, when an ONU is in Tx sleep-mode, the ONU's receiver is awake, so the ONU can detect a fiber failure. When the ONU detects a fiber failure, the ONU "powers-up", transitioning to awake-mode. Refer to the description above of applying solution set #1 to problem #2 (Tx ONU switchover while in sleep-cycle).

2. ONU at Tx/Rx sleep-mode: when detecting a fiber failure or switchover notification during an awake-cycle, transitions directly from the awake-cycle to awake-mode (without re-entering a sleep-cycle). As during Tx/Rx sleep-mode both the ONUs transmit and receive paths are powered down, the ONU cannot detect a fiber failure during sleep-cycle. However, as the OLT is changed to wait an extended prior of time before declaring fiber failure, the ONU has time to (transition to awake-cycle) wake up the ONUs Rx path and detect fiber failure. Refer to the description above of applying solution set #1 to problem #3 (Tx/Rx ONU switchover while in sleep-cycle).

3. ONU at Tx/Rx sleep-mode: set (extend) length of awake-cycle to be greater than $T_{LoS}$. Refer to the description above of applying solution set #1 to problem #6 (ONU time for fiber failure detection).

4. ONU: Optional implementation of a solution at the ONU to handle false failure detection, as described below in the section "applying solution set #1 and #2 to problem #7".

5. OLT: increasing by up to maximum sleep time of all registered LLIDs the switching time ($T_{switch}$) the OLT waits before declaring fiber failure and initiating a holdover. Refer to the description above of applying solution set #1 to problem #1 (OLT detection).

6.1.10 In summary, solution set #1 features changes to conventional (existing standard) fiber protection scheme including:

1. OLT: Set (extend) switchover time $T_{switch}$ to be equal to or longer than maximum sleep time of all registered LLIDs. Refer to the description above of applying solution set #1 to problem #1 (OLT detection).

2. ONU: At Tx/Rx sleep-mode: check for a switchover state after awake-cycle, and if fiber failure, transition from power-save awake-cycle to awake-mode and from REGISTERED to HOLDOVER state. Refer to the description above of applying solution set #1 to problem #3 (Tx/Rx ONU switchover while in sleep-cycle).

3. OLT: Handling ONUS at Tx/Rx sleep-mode: Set (extend) length of awake-cycle to be greater than $T_{LoS}$. Refer to the description above of applying solution set #1 to problem #6 (ONU time for fiber failure detection).

For completeness, note that OLT: at manually invoked fiber protection, delays to insure that all ONUs are in awake-mode (not in sleep-mode) before initiating switchover. See description above related to the case of manually invoked fiber failure.

Figure 8:
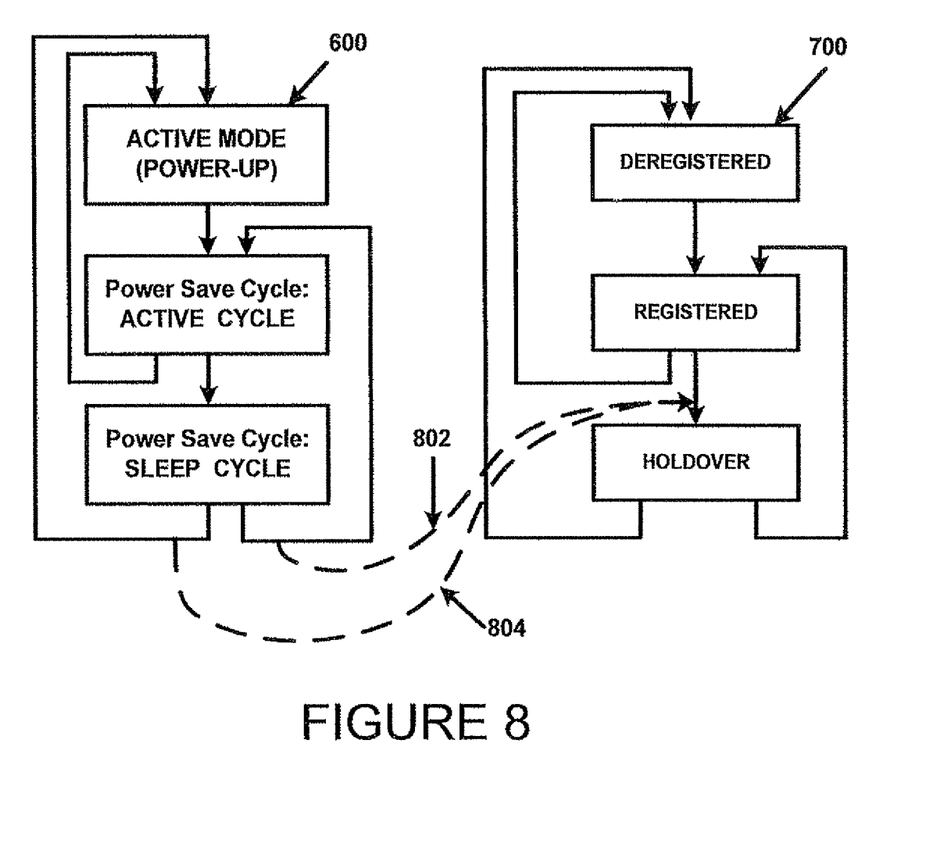
FIG. 8 is a diagram of ONU state transitions for solution set #2.

Second Embodiment—FIG. 8

6.2 If not all ONUs are in sleep-cycle, the user may choose to allow the OLT to detect fiber failure based on some (a portion of) non-responsive ONUs. This assumes that some ONUs is sufficient for detecting fiber failure.

In an extreme case even if one ONU is "important" (high service level agreement—SLA) and is non-sleeping and all the rest are non-important (low SLA) then fiber failure detection for this one important ONU may cause a fiber failure detection and an OLT switchover. Otherwise, any algorithm can be used to do switchover based on detection of majority of ONUs or a combination of majority and priority of ONUs. In a non-limiting example algorithm, if two or more ONUs of high-priority or four or more ONUs of any priority have not transmitted REPORT during $T_{LoS}$, then the OLT declares fiber failure.

The following description examines a second implementation, also known in this document as solution set #2, to problems #1-6, 8-9 above, in the context of the previous assumption.

Solution set #2 facilitates improvements over conventional (existing) power save techniques, including:

A. Solution set #2 overcomes less-desirable operating issues of solution set #1, as described below.

B. Solution set #2 allows a switchover without checking all ONUs, thus a faulty switchover may happen (although the chance can be relatively extremely low if a few ONUs are awake). Solution set #2 is more complex than solution set #1, so care should be taken to avoid implementation errors.

C. If all ONUs are in sleeping in Tx/Rx sleep-mode or Tx sleep-mode without early wake up, then solution set #2 can be used as a hybrid solution by waiting for some ONUs to wake up, if some ONUs have a low value length of sleep-cycle.

6.2.1 Applying solution set #2 to problem #1 (OLT detection), since detection is based only on awake ONUs (ONUs in awake-mode) then a change in fiber failure detection includes detecting based a portion of the ONUs, as decided by the user. Based on this description, one skilled in the art will be able to implement a detection algorithm appropriate for a specific application.

There are four kinds of ONUs, in other words, ONUs in four states of operation:

1. Tx/Rx—an ONU in the Tx/Rx sleep-mode cannot respond to communications from an OLT, as both the receive path and the transmit path are powered-down.
2. Tx without early wakeup: The working OLT does not know if the ONUs have:
   A. encountered fiber failure and cannot respond due to the fiber failure, or
   B. if the ONUs do not respond since although there is no problem as far as these ONUs know, the transmit path is powered down in Tx sleep-mode.
3. Tx with early wakeup: The working OLT transmits a wakeup signal to all ONUs, and the ONUs with early wakeup capability transition to awake-mode. Now these ONUs in awake-mode can be used for supporting the probability of correct detection of fiber failure. When the OLT detects fiber failure in some awake-mode (power-up) ONUs, the OLT may send a wakeup signal to ONUs in the Tx sleep-mode which support early-wakeup, in order to increase probability of the OLT fiber failure detection.
4. Awake-mode (power-up/non power save) ONUs: these ONUs in awake-mode can be used for detecting fiber failure.

6.2.2 Applying solution set #2 to problem #2 (Tx ONU switchover while in sleep-cycle), the same scheme is used as described above in reference to applying solution set #1 to problem #2

6.2.3 Applying solution set #2 to problem #3 (Tx/Rx ONU switchover while in sleep-cycle), an OLT switchover may have happened while an ONU was in power-save sleep-cycle. In this case the ONU will wake up at the next awake-cycle without knowing that an OLT switchover has happened. There will now be two problems: the new working OLT has a (1) new timestamp and (2) a new OLT MAC address.

Therefore the ONU, waking up from sleep-cycle, has to assume that a switchover has occurred. The transition from REGISTERED to HOLDOVER state happens at every transition from sleep-cycle (power save sleep state). As shown in FIG. 8, a diagram of ONU state transitions for solution set #2, in ONU operational state diagram 600, when the ONU transitions from sleep-cycle to awake-cycle or to awake-mod; in the ONU switchover state diagram 700, the ONU transitions from REGISTERED to HOLDOVER state, as indicated respectively by arrows 802 and 804. The ONU will exit HOLDOVER state once the ONU receives from an OLT a SYNC_GATE or any later GATE. Note that an ONU that is still in sleep-mode, when transitioning to an awake-state (as opposed to being at the end of a sleep-mode and transitioning from sleep-cycle to awake-mode) does not know if a switchover has occurred, so will wait to receive a GATE from a working OLT. If the working OLT is the same working OLT as before the ONU went into sleep-cycle, the ONU can continue to work as configured (for example, continuing in sleep-mode by transitioning to another sleep-cycle). If the working OLT is a new OLT, the ONU will transition to awake-mode.

In the awake-cycle, the ONU may detect a switchover occurrence, that is, that a switchover has been done, by various conditions, including:
1. Updated OLT MAC Address.
2. Updated time stamp.

When detecting a switchover, the ONU will transition from awake-cycle to awake-mode (power-up state) in the ONU operational state diagram (also known as ONU power saving state machine).

If the ONU has recognized an updated timestamp, an updated OLT MAC address, or another indication/condition that there is a new OLT, the ONU will stop the power save cycle and transition to awake-mode (power-up) state.

This solution features a change in the regular method of power save since now ONUs in Tx/Rx sleep-mode must go to HOLDOVER state after every wake up. This is non-obvious, since the fiber protection protocol looks orthogonal to the power save protocol so one would not expect the power save protocol to cause a change in fiber protection protocol. In other words, conventional power save protocol is unrelated to protection protocol in the existing standards.

6.2.4 Applying solution set #2 to problem #4 (new working OLT transmits a one-time SYNC_GATE), if a switchover has happened while a Tx/Rx ONU was in sleep-cycle then the ONU may miss the SYNC_GATE and have a wrong timestamp.

A solution is that the new working OLT will repeatedly transmit SYNC_GATEs as long as maximum sleep time of all registered LLIDs has not passed. The SYNC_GATEs must be transmitted at a time delta which is smaller than the ONUs' length of awake-cycle in order to make sure that the ONUs will recognize the SYNC_GATE. Delaying the transmission of SYNC_GATE by maximum sleep time of all registered LLIDs has no advantage over the solution set #1 and is therefore not recommended. Transmission of SYNC_GATES includes transmission of broadcast SYNC_GATES and discovery SYNC_GATES.

The SYNC_GATE may be transmitted as a broadcast packet using the IEEE 802.3

Discovery packet. This will allow all 1 G-ETON-Security encrypted ONUs to synchronize. This may also save the need of transmitting a GATE for each ONU.

This solution features a change in the regular method of fiber protection since now the OLT has to transmit SYNC_GATE multiple times. This repeated transmission seems non-intuitive when talking about only fiber protection. Also, this repeated transmission is not needed if solution set #1 is chosen for implementation. Also, transmitting a broadcast SYNC_GATE or a Discovery packet as a SYNC_GATE is not the regular method of choice.

An alternative approach is to not transmit SYNC_GATE at all if the SYNC_GATE is not required. This is based on the fact that each ONU will eventually get a GATE for transmitting REPORT and maybe data.

62.5 Applying solution set #1 to problem #5 (new working OLT may not know the wake-up time of sleeping ONUs), if a switchover has happened while a Tx/Rx ONU was in sleep-cycle then the new working OLT may not know when the sleeping ONU will wake up. Therefore the OLT needs to wake up the ONU, and then have the ONU re-enter power save, if appropriate for each awakened ONU. As for Tx sleeping ONUs, these ONUs are already power-up since these ONUs have detected fiber failure.

The new working OLT must also transmit a wakeup command to all Tx/Rx ONUs as long as maximum sleep time of all registered LLIDs has not passed. The wakeup must be transmitted at a time delta which is smaller than the ONUs length of awake-cycle in order to make sure that the ONU will recognize the wakeup. Typically, a wakeup command is implemented by the transmission of a wakeup packet. Transmission of wakeup packets can include transmission of broadcast wakeup packets.

After the ONU has transitioned to awake-mode, then if suitable, the whole process of power saving will start automatically at a normal manner with the new working OLT.

The wakeup command may be transmitted from the OLT as a broadcast packet.

The wakeup command and the SYNC_GATE command have different purposes and must both be transmitted. There is no importance as to which command is first.

Delaying the transmission of wakeup by maximum sleep time of all registered LLIDs has no advantage over the solution set #1 and is therefore not recommended.

This solution features a change in the regular method of fiber protection since now the OLT has to transmit the wakeup command multiple times, while this seems non-intuitive when talking about only fiber protection. Also, repeated transmission is not needed if solution set #1 is chosen for implementation. Also, transmitting a broadcast wakeup is not the regular method of choice.

6.2.6 Applying solution set #2 to problem #6 (ONU time for fiber failure detection), since a Tx/Rx sleeping ONU does not have to detect fiber failure then there is no issue with the time that the ONU takes to detect fiber failure.

6.2.7 Applying solution set #2 to problem #8 (Calculation of RTT for all ONUs), for two cases where:
1. either the OLTs (working and standby) share the same RTT values,
2. or the standby OLT already knows the RTT map, there is no problem (#8, calculation of RTT for all ONU's).
3. For a case where a new working OLT has the RTT map of the previous working OLT, then the new working OLT must find the RTT of only one ONU. Using the new RTT from this one ONU and the known old RTT from this ONU, the OLT can calculate a difference between the new RTT and the old RTT, and the add/subtract that difference from the other ONUs' RTTs, thus saving the need and the time for finding (receiving) the RTT from the other ONUs. An exemplary algorithm for finding this one ONU is as follows:
    A. Start with a first set of all ONUs which have the minimum value of length of sleep-cycle, referred to as sleep_time_level1.
    B. For this first set of ONUs, choose any one ONU, if RTT can be found for this one ONU, then done.
    C. else choose another ONU from the first set,
    D. repeat until sleep_time_level1 expires and all ONUs of this group have been tried
    E. If RTT is still not found, repeat the above using a second set of ONUs which have a next minimum level of length of sleep-cycle.
4. Always synchronize the RTT map from the working OLT to the standby OLT, to avoid a case where the standby OLT does not have any working OLT RTT map.

Alternatively, in order to avoid using solution set #1 (which has a slower switchover), the working OLT must always keep N ONUs (where N is an integer number) known as pivot ONUs, or a list of pivot ONUs) at either non-power-save or at Tx sleep-mode. The list of these pivot ONUs can be static. Information regarding pivot ONUs can be passed to the standby OLT, so that when the standby OLT becomes the new working OLT, the standby OLT can refer to any of these N pivot ONUs as a known base for RTT calculating. N may be any number with typical values of one or two. Even if the information of which ONUs are non power saving or at Tx sleep-mode has not passed to the new working OLT, if the new working OLT knows that there are N ONUs like this then the search algorithm will reveal fast results. The use of Tx sleep-mode is based on the fact that such an ONU will wake up when detecting fiber failure.

An alternative description of the above PON includes configuring the PON with at least one ONU and at least one OLT.

In the case where a portion of the ONUs is static, in other words the pivot list, or identity of a portion of the ONU's is static, the PON can be configured with more than one (a plurality) on ONUs, to provide a first portion first pivot list) and second portion (second pivot list). The PON architecture can be configured in a configuration including either trunk_1 or trunk_2.

This solution features a change in the regular power save method since this solution requires some ONUs to not be in Tx/Rx sleep-mode. This is not obvious since this solution increases the overall system power consumption, which is contrary to the general goal of power savings in the system.

6.2.9 In summary, solution set #2 features changes to conventional (existing standard) power-save scheme including:

1. ONU at Tx sleep-mode: when detecting a fiber failure transition to awake-mode (power-up/exits power save cycle). Refer to the description above of applying solution set #2 to problem. #2 (Tx ONU switchover while in sleep-cycle).

2. ONU at Tx/Rx sleep-mode: invoke a HOLDOVER state after every power save wake up (every change from sleep-cycle to awake-cycle or to awake-mode). Refer to the description above of applying solution set #2 to problem #3 (Tx/Rx ONU switchover while in sleep-cycle), 3. Optional implementation of requiring some ONUs to not be in Tx/Rx sleep-mode. Refer to the description above of applying solution set #2 to problem #8 (Calculation of RTT for all ONUs), 4. ONU: Optional implementation of a solution at the ONU to handle false failure detection, as described below in the section "applying solution set #1 and #2 to problem #7".

6.2.10 In summary, solution set #2 features changes to conventional (existing standard) fiber protection scheme including:

1. OLT: Check for fiber failure based on some ONUs. Refer to the description above of applying solution set #2 to problem #1 (OLT detection).

2. ONU: ONUs in Tx/Rx sleep-mode must go to HOLDOVER state after every wake up. Refer to the description above of applying solution set #2 to problem #3 (Tx/Rx ONU switchover while in sleep-cycle).

3. OLT: New working OLT repeatedly transmits SYNC_GATEs at a time delta which is less than the ONUs' length of awake-cycle and as long as maximum sleep time of all registered LLIDs has not passed. Refer to the description above of applying solution set #2 to problem #4 (new working OLT transmits a one-time SYNC_GATE).

4. OLT: New working OLT transmits repeatedly a wakeup command to all Tx/Rx ONUs at a time delta which is smaller than the ONUs length of awake-cycle and as long as maximum sleep time of all registered LLIDs has not passed. Refer to the description above of applying solution set #1 to problem #5 (new working OLT may not know the wake-up time of sleeping ONUs).

For completeness, note that OLT: at manually invoked fiber protection, delays to insure that all ONUs are in awake-mode (not in sleep-mode) before initiating switchover. See description above related to the case of manually invoked fiber failure.

6.3 Applying solution set #1, and #2 to problem #7 (false failure detection), false OLT fiber failure detection has a low probability as described above in reference to problem #7—OLT false fiber failure detection.

Options for handling false failure detection include:

1. Ignore this problem. The probability of this problem is low, and the penalty of an un-needed switchover is low, although there will be some traffic loss.

2. Changing operation of the ONU to transmit two REPORT packets at each awake-cycle. This may extend the awake-cycle by a DBA cycle (typical by 0.5 ms), thus adding minor power consumption to the power consumption of conventional operation.

An example of conventional power consumption:
Awake_cycle_orig=2 ms
Sleep_cycle=98 ms
DBA_Cycle is 0.5 ms
Power_saving_orig=98/(98+2)=98%

An example of power consumption when transmitting two REPORTs:
Awake_cycle=2.5 ms
Sleep_cycle=97.5 ms
DBA_Cycle is 0.5 ms
Power_saving_orig=97.5/(97.5+2.5)=97.5%

This solution for OLT false fiber failure detection features a change in the conventional power save protocol that is not obvious, as in conventional protocols there is no need for two or more REPORTs, and adding REPORTS increases the power consumption of the PON system.

Third Embodiment 6.4 In a system where the above innovative power save and fiber protection schemes have been implemented, an embodiment described below can be used to provide encryption compatible with the combined fiber protection and power savings, in other words defining an integration (cross correlation) of fiber protection, power save, and encryption. Note that the term "encryption" is generally used below in the general sense of including both encryption and decryption.

6.4.1 As a guide to the reader, there are currently three popular modes of encryption in use and/or being developed. The below description includes non-limiting examples of the current embodiment in the context of each of these three modes of encryption:

A. 1 G-EPON-SECURITY RCC. Unique, as this mode uses timestamp from an OLT with RCC from an ONU. (Refer to problems #9, # 10, below.)

B. CTC Triple Churn (3churn) for 1 G/10 G. This method of encryption will continue to work with the above embodiments for power save and fiber protection. (No changes necessary).

C. 802.1AE (standard-based encryption for 10 G). Requires OLT.SA (OLT source address/MAC address) to be known to the OLT and ONU. (Refer to problems #11, #12, below.)

6.4.2.1 Problem #9—1 G-EPON-SECURITY RCC: This mode of encryption uses a timestamp (PCC, 32 LSB of OLT PON counter) from an OLT with RCC (32 MSB of ONU PON counter) from an ONU as an input for the encryption block engine. The timestamp is 32 bits which has a wraparound about every 67 seconds. The PCC (time stamp) will be synchronized between the OLT and the ONU, when the ONU receives broadcast MPCP message (like Discovery frame) or Sync frame. RCC enhances the timestamp to 64 bits which has a wraparound time which is much larger than a man's lifetime. As the RCC is not transmitted in the packets from the OLT to the ONU, the RCC on the OLT needs to be synchronized with the RCC on the ONU for successful encryption (encryption and decryption).

A problem with this mode of encryption is that after a switchover, the counter of the new working OLT and ONU are normally not synchronized, so the OLT and ONU are not able to successfully encrypt nor decrypt packets.

In addition, there is a question about Tx/Rx sleep-mode in solution set #2 where switchover can happen without the ONU being aware that a new OLT is now the working OLT.

Hence, the new working OLT has a different counter and will transmit timestamps that are not consistent with the previously received timestamps from the previous working OLT.

6.4.2.2 Solution #9 (solution to problem #9):

For a system using a trunk architecture there is only one OLT, so there is no need to reset the RCC, and problem #9 is avoided.

For a system using a trunk_1 architecture, there are two OLTs. At HOLDOVER state, the RCC of an ONU will be reset. The new working OLT must start a new encryption session, thus the counters (RCCs) of the new working OLT will be reset (get cleared). [As a note, for completeness, in order for the standby OLT (previously working OLT) to start a new encryption session, the standby OLT must stop the old/previous encryption operation in order to allow a new encryption session when the standby OLT switches over to become a working OLT.] In general, when an OLT starts encrypted communications with a corresponding ONU, the OLT's RCC counter is reset, the OLT sends a timestamp to the ONU for PCC synchronization, and the ONU's RCC counter is reset.

In order to provide automatic fiber protection in this mode, preferably the ONU does not know if the ONU is part of a trunk_1 or trunk_2 architecture. This can be accomplished by configuring the ONU as follows:

9.1. The ONU initially assumes trunk_2 architecture and continuing (maintaining) normal operation of the RCC (does not reset the RCC) at HOLDOVER state.

9.2. The OLT knows if trunk_2 or trunk_1 is being used. In trunk_1 upon switchover, the OLT will reset the counter (RCC) as explained above.

9.3 On the ONU, if a switchover has recently occurred (for example in the last 500 ms) and the ONU has not been able to receive any packets due to decrypter error, then the ONU knows that a trunk_1 architecture is being used, and the counter on the ONU is reset (resets the ONU's RCC). Now the OLT and the ONU are both using reset counters, the RCCs are synchronized and the OLT and ONU will be able to successfully encrypt.

Regarding Tx/Rx sleep-mode in solution set #2 and a switchover has happened without the ONU knowing, then the ONU will not be able to receive any packets due to decrypter error. Thus, a decryption error will cause the ONU to transition from power-save sleep-cycle (sleep state) to awake-mode, from REGISTERED to HOLDOVER state, and then reset the RCC (counter on the ONU). This solution is consistent with the above-described solutions for solution set #2. When not in Tx/Rx sleep-mode, the ONU will receive a wakeup command from the OLT, together with decryption errors, will cause an RCC reset.

This solution features a change in the regular 1 G-EPON-security method since now if the ONU recognizes decryption errors, the ONU resets the RCC. This is non-obvious.

6.4.3.1 Problem #10—Upstream encryption. In normal operation, an OLT sends a key to an ONU to use for the ONU to use for decrypting downstream data and encrypting upstream data. The ONU is capable of supporting both previous (old) and current (new) encryption keys so after switchover the new working OLT can use the previous key for encrypting downstream data (since the ONU has not yet been sent the new decryption key). However, a problem remains in the upstream, that is, what key does the ONU use for encrypting upstream data?

For completeness, the Tx/Rx sleep-mode in solution set #2 needs to also be considered, specifically if there will be a problem with the ONU sleeping during switchover.

6.4.3.2 Solution #10 (solution to problem #10): After being in the HOLDOVER state, the ONU should always use the previous key for encrypting upstream data, until a new key is received.

For Tx/Rx sleep-mode in solution set #2, when exiting sleep-cycle the ONU will recognize decrypter errors, and then transition from REGISTERED to HOLDOVER state. After holdover the previous key will be used for upstream encryption. Otherwise, at Tx/Rx if a real switchover has happened the ONU will get a SYNC_GATE (with a new OLT MAC address) or a wakeup, recognize a new OLT and will know that a switchover has happened, and then the previous key will be used.

While similar conventional techniques exist for downstream decryption, conventional teachings have not considered using these techniques to solve the problem of upstream encryption. Using the current method for upstream encryption is an innovative solution to this upstream encryption problem.

6.4.4.1 Problem #11—802.1AE Short SecTag: For 802.1AE with short SecTag there is a need to have a pre-shared index (called SCI). The SCI is an index to the secure channel, a 64-bit index, and is built as follows:

48-bit OLT MAC Address (OLT.SA)

16-bit LLID (with MSB='0')

After switchover there is a new OLT with a new MAC address. A problem is that the ONU now has to learn the new OLTs SA (source address) after each switchover before the ONU can start decrypting. This is problematic for solution set #2 where the ONU assumes a holdover at every wakeup from Tx/Rx.

In other words, the fact that there is a new working OLT means that fiber protection occurred and there was a switchover. However, the ONU is still configured to operate with the old OLT. In this case, how are encryption keys handled?

6.4.4.2 Solution #11. According to the 802.1AE specification, there is no requirement to have the same SCI for the OLT and the ONU when working with short SecTag. In other words, the SCI is optional and not needed when using short SecTag. So, at the OLT there is a short SecTag index called '2' or '3', but this index is an index to the special case of the "no index". The same is true for the ONU. Thus, in fact, there is no need to have the same index on both the OLT and ONU for successful decryption at the ONU.

So, a new working OLT will have a new SCI for the short SecTag. The new working OLT will use a most recently updated key at the OLT which is the ONU's current key or the previous key. The ONU can support both keys, indexed by the 2-bit AN (Association Number) parameter which is explicit also at short SecTag. In other words when a PON system is implemented using power save and fiber protection according to the above description, encryption according to 802.1AE can be used without further modification to the above described solution set #1 and #2.

6.4.5.1 Problem #12—802.1AE replay protect: The optional replay protect is a counter which advances for each packet. However, the standby OLT is not aware of the current value of this counter, so after a switchover, decryption will fail.

6.4.5.2 Solution #12. A solution to the 802.1AE replay protect problem can include the following:

12.1 Step 1. The nextPN value for replay protect may always increase up to the limit of 0xffff_ffff. There is an assumption that the new key (after OLT switchover) always gives sufficient time for replacing keys before getting near the 0xffff_ffff value. Thus, the new working OLT should change the nextPN to a value near 0xffff_ffff and afterwards the new working OLT should change the SA (keys and nextPN) as soon as possible. The same method should be used on the ONU (change the nextPN to a value near 0xffff_ffff).

Typical values for replay protect include: 100 ms for changing the keys, which is ~2M packets (of 64 B) at 10 G rate which is 2^21, so change (jump) the nextPN to 0xffc0_0000.

Note that this solution also works for Tx/Rx sleep-mode with solution set #2.

12.2 Step 2. DS (downstream) and US (upstream) keys in working operation should be changed before nextPN reaches 0xffc0_0000 and DS and US keys must be changed within 100 ms from switchover.

An alternative description of the current solution is to reserve values of nextPN above a pre-determined value. The reserved values will be used during switchover. After switchover, setting nextPN to one of the reserved values.

This solution includes a new method of handling the replay protect with fiber protection switchover, using the non-intuitive fact that the nextPN is not a rolling counter, so the transmitter can increase the nextPN as much as the transmitter wants.

As can be seen from the above description, using the Standard's set of definitions of each area in EPON does not provide a complete solution to simultaneous operation of various beneficial features of the EPON. When a user (service provider, system vendor, or chipset vendor) requires maximum benefits from the EPON system, the user needs a combination of definitions that work with all of the beneficial features together as a system. The above embodiments include innovative solutions for simultaneously operating of features (powersave, protection, and encryption) and gaining benefit from each one of these features, while preserving the Standard's definitions.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

The use of simplified calculations to assist in the description of this embodiment does not detract from the utility and basic advantages of the invention.

It should be noted that the above-described examples, numbers used, and exemplary calculations are to assist in the description of this embodiment. Inadvertent typographical and mathematical errors do not detract from the utility and basic advantages of the invention.

It will be appreciated that the above descriptions are intended only to serve as examples, and that many other embodiments are possible within the scope of the present invention as defined in the appended claims.

What is claimed is:

1. A method for operating a PON (passive optical network) including at least one ONU (optical networking unit) and an OLT (optical line terminal), wherein
  at least one of the at least one ONU is operating in Tx or Tx/Rx power saving sleep-mode;
  in an awake-mode each ONU's subsystems in transmit and receive paths are powered up and functional;
  in a sleep-mode some of each ONU's subsystems in transmit (Tx sleep-mode) and transmit and receive (Tx/Rx sleep-mode) path can be powered down;
  sleep-cycle is a period of time during sleep-mode in which some of each ONU's subsystems are powered down;
  awake-cycle is a period of time during sleep-mode between sleep-cycles;
  length of awake-cycle is an amount of time for which each ONU is requested to enter an awake-cycle;
  loss of signal time (TLoS) is a period of time that has to elapse from a loss of signal before the OLT or each ONU transitions to a switchover state;
  switchover time (Tswitch) is a period of time that has to elapse after loss of signal before the OLT initiates switchover to a standby OLT; and
  maximum sleep time of all registered LLIDs is a maximum length of sleep-cycle of each registered ONU, comprising the steps of:
    a. setting length of awake-cycle of each ONU to be greater than TLoS (loss of signal time);
    b. transitioning said each ONU, upon detecting a fiber failure, switchover notification, or switchover occurrence:
      i. from sleep-mode to awake-mode; and
      ii. from REGISTERED to HOLDOVER state, and
    c. setting Tswitch (switchover time) of the OLT to be at least as long as maximum sleep time of all registered LLIDs.

2. The method of claim 1 further comprising the step of
  d. transmitting, by each ONU, two REPORT packets at each awake-cycle.

3. The method of claim 1 wherein at least one of the at least one ONU corresponds to a first portion of ONUs corresponding to a first pivot list of ONUs, further comprising the step of:
  d. configuring, by the OLT, said first portion of ONUs to be in a mode other than Tx/Rx sleep-mode.

4. The method of claim 3 wherein the PON includes at least two ONUs and a second portion corresponding to a second pivot list of ONUs includes at least one of the at least two ONUs other than in said first portion, and said first portion of ONUs is changed to include at least said second portion of ONUs.

5. The method of claim 3 wherein said first pivot list of ONUs is static and transmitted from the OLT to a standby OLT.

6. The method of claim 1 wherein the PON includes at least two ONUs, further comprising the step of:
  d. checking, by the OLT, for fiber failure based on a portion of the at least two ONUs.

7. The method of claim 1 further comprising the step of:
  d. transmitting repeatedly until maximum sleep time of all registered LLIDs has passed, by the OLT, SYNC_GATES at a time delta which is less than each ONU's length of awake-cycle.

8. The method of claim 1 further comprising the step of:
  d. transmitting repeatedly until maximum sleep time of all registered LLIDs has passed, by the OLT, a wakeup command at a time delta which is less than each ONU's length of awake-cycle.

9. The method of claim 1 wherein the OLT includes an OLT RCC (round cycle counter) and each ONU includes an ONU RCC, further comprising the steps of:
  d. continuing, at each ONU, normal operation of each of the ONU RCC at HOLDOVER state;
  e. resetting, at the OLT, OLT RCC upon switchover if the PON is configured as a trunk_1 architecture; and
  f. resetting RCC at each ONU if:
    i. each ONU is in HOLDOVER state;
    ii. switchover has occurred within a designated period; and
    iii. each ONU is unable receive packets due to decrypter error.

10. The method of claim 1 further comprising the step of:
 d. continuing, at the ONUs, to use a previous encryption key for encrypting upstream data, while in HOLDOVER state.

11. The method of claim 1 further comprising the steps after a switchover of:
 d. setting, at the OLT and the ONUs, a value of nextPN to be a pre-determined value less than 0xffff_fff based on a given time; and
 e. changing in less than said given time, by the OLT, to use new encryption keys.

12. The method of claim 1 further comprising the steps of:
 d. reserving values of nextPN above a pre-determined value, the reserved values to be used during switchover; and
 e. setting nextPN, after a switchover, to one of the reserved values.

13. The method of claim 1 wherein said EPON is selected from the group consisting of:
 a. a 1G EPON; and
 b. a 10G EPON.

14. The method of claim 1 wherein said pre-determined value is selected from the group consisting of
 a. 0xfc0_fff; and
 b. a value based on at least the minimum time required for changing encryption keys.

* * * * *